United States Patent
Strait et al.

(10) Patent No.: US 8,250,305 B2
(45) Date of Patent: Aug. 21, 2012

(54) METHOD, SYSTEM AND COMPUTER PROGRAM PRODUCT FOR DATA BUFFERS PARTITIONED FROM A CACHE ARRAY

(75) Inventors: Gary E. Strait, Poughkeepsie, NY (US); Deanna P. Dunn, Poughkeepsie, NY (US); Michael F. Fee, Cold Spring, NY (US); Pak-kin Mak, Poughkeepsie, NY (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 12/051,244

(22) Filed: Mar. 19, 2008

(65) Prior Publication Data

US 2009/0240891 A1    Sep. 24, 2009

(51) Int. Cl.
  *G06F 13/00* (2006.01)
  *G06F 13/28* (2006.01)
(52) U.S. Cl. ........... 711/129; 711/118; 711/E12.042; 711/E12.046
(58) Field of Classification Search .............. None
  See application file for complete search history.

(56) References Cited

U.S. PATENT DOCUMENTS

| | | | |
|---|---|---|---|
| 5,680,573 A * | 10/1997 | Rubin et al. | 711/129 |
| 5,875,464 A * | 2/1999 | Kirk | 711/129 |
| 5,893,148 A | 4/1999 | Genduso et al. | |
| 5,893,155 A * | 4/1999 | Cheriton | 711/144 |
| 6,038,644 A | 3/2000 | Irie et al. | |
| 6,223,256 B1 * | 4/2001 | Gaither | 711/134 |
| 6,363,468 B1 | 3/2002 | Allison | |
| 6,421,761 B1 * | 7/2002 | Arimilli et al. | 711/128 |
| 6,594,728 B1 * | 7/2003 | Yeager | 711/127 |
| 6,959,430 B2 | 10/2005 | Sokolov et al. | |
| 7,003,597 B2 | 2/2006 | Georgiou et al. | |
| 2002/0002657 A1 * | 1/2002 | Sturges et al. | 711/129 |
| 2007/0130237 A1 | 6/2007 | Altman et al. | |
| 2009/0161684 A1 | 6/2009 | Voruganti et al. | |
| 2009/0240891 A1 | 9/2009 | Strait et al. | |

FOREIGN PATENT DOCUMENTS

| | | |
|---|---|---|
| WO | 2007099483 A2 | 9/2007 |
| WO | 2008026142 A1 | 3/2008 |

OTHER PUBLICATIONS

Chuang et al., "Architecture and Design of A Pseudo Two-Port VLSI Snoopy Cache Memory", Proceedings of the 1990 IEEE International Conference on Computer and Software Engineering, May 1990, pp. 400-407.
Chuang et al., "An On-Chip 72K Pseudo Two-Port Cache Memory Subsystem", 1990 Symposium on VLSI Circuits, 1990 Digest of Technical Papers, Jun. 1990, pp. 113-114.

* cited by examiner

*Primary Examiner* — Kevin Ellis
*Assistant Examiner* — Eric S Cardwell
(74) *Attorney, Agent, or Firm* — Cantor Colburn LLP; John Campbell

(57) ABSTRACT

Systems, methods and computer program products for data buffers partitioned from a cache array. An exemplary embodiment includes a method in a processor and for providing data buffers partitioned from a cache array, the method including clearing cache directories associated with the processor to an initial state, obtaining a selected directory state from a control register preloaded by the service processor, in response to the control register including the desired cache state, sending load commands with an address and data, loading cache lines and cache line directory entries into the cache and storing the specified data in the corresponding cache line.

20 Claims, 5 Drawing Sheets

| GX DMA READ SLOT | CP0 | | CP1 | | CP2 | | CP3 | |
|---|---|---|---|---|---|---|---|---|
| | GX0 | GX1 | GX2 | GX3 | GX4 | GX5 | GX6 | GX7 |
| 0 | 000-00004000 CongrC1: 010 | 000-0000C000 CongrC1: 030 | 000-00014000 CongrC1: 050 | 000-0001C000 CongrC1: 070 | 000-00024000 CongrC1: 090 | 000-0002C000 CongrC1: 0B0 | 000-00034000 CongrC1: 0D0 | 000-0003C000 CongrC1: 0F0 |
| 1 | 000-00004400 CongrC1: 011 | 000-0000C400 CongrC1: 031 | 000-00014400 CongrC1: 051 | 000-0001C400 CongrC1: 071 | 000-00024400 CongrC1: 091 | 000-0002C400 CongrC1: 0B1 | 000-00034400 CongrC1: 0D1 | 000-0003C400 CongrC1: 0F1 |
| 2 | 000-00004800 CongrC1: 012 | 000-0000C800 CongrC1: 032 | 000-00014800 CongrC1: 052 | 000-0001C800 CongrC1: 072 | 000-00024800 CongrC1: 092 | 000-0002C800 CongrC1: 0B2 | 000-00034800 CongrC1: 0D2 | 000-0003C800 CongrC1: 0F2 |
| 3 | 000-00004C00 CongrC1: 013 | 000-0000CC00 CongrC1: 033 | 000-00014C00 CongrC1: 053 | 000-0001CC00 CongrC1: 073 | 000-00024C00 CongrC1: 093 | 000-0002CC00 CongrC1: 0B3 | 000-00034C00 CongrC1: 0D3 | 000-0003CC00 CongrC1: 0F3 |
| 4 | 000-00005000 CongrC1: 014 | 000-0000D000 CongrC1: 034 | 000-00015000 CongrC1: 054 | 000-0001D000 CongrC1: 074 | 000-00025000 CongrC1: 094 | 000-0002D000 CongrC1: 0B4 | 000-00035000 CongrC1: 0D4 | 000-0003D000 CongrC1: 0F4 |
| 5 | 000-00005400 CongrC1: 015 | 000-0000D400 CongrC1: 035 | 000-00015400 CongrC1: 055 | 000-0001D400 CongrC1: 075 | 000-00025400 CongrC1: 095 | 000-0002D400 CongrC1: 0B5 | 000-00035400 CongrC1: 0D5 | 000-0003D400 CongrC1: 0F5 |
| 6 | 000-00005800 CongrC1: 016 | 000-0000D800 CongrC1: 036 | 000-00015800 CongrC1: 056 | 000-0001D800 CongrC1: 076 | 000-00025800 CongrC1: 096 | 000-0002D800 CongrC1: 0B6 | 000-00035800 CongrC1: 0D6 | 000-0003D800 CongrC1: 0F6 |
| 7 | 000-00005C00 CongrC1: 017 | 000-0000DC00 CongrC1: 037 | 000-00015C00 CongrC1: 057 | 000-0001DC00 CongrC1: 077 | 000-00025C00 CongrC1: 097 | 000-0002DC00 CongrC1: 0B7 | 000-00035C00 CongrC1: 0D7 | 000-0003DC00 CongrC1: 0F7 |
| PSI | 000-00009000 CongrC1: 024 (Simulation Only) | (Simulation Only) | 000-00019000 CongrC1: 064 (Simulation Only) | (Simulation Only) | 000-00029000 CongrC1: 0A4 | | 000-00039000 CongrC1: 0E4 | |

Note: Since CP4 has no active GX interfaces, no CP4 slots are reserved. PSI has slots for CP2 and CP3. Additional slots may be reserved for simulation.

If12uf_cac_buf_cc_q(1:2) = 01, add 000-00080000 to all addresses and add 200 to Congruence Class
If12uf_cac_buf_cc_q(1:2) = 10, add 000-00100000 to all addresses and add 400 to Congruence Class
If12uf_cac_buf_cc_q(1:2) = 11, add 000-00180000 to all addresses and add 600 to Congruence Class Add 000-00000100 to all addresses if on SC1 chip
Add 000-00000200 to all addresses if in subpipe 1 on either SC chip Note: There are no spare congruence classes defined, sparing is by switching compartment or pipe only. Corresponding GX queue positions may also be disabled to avoid failing cache slots.

FIG. 4

| STACK CACHE LINE | RESPONSE STACK SLOTS (16 PER CACHE LINE) QUADWORD ADDRESSES PER LOGICAL PU. | | | | | | | |
|---|---|---|---|---|---|---|---|---|
| 0 CongrCl: 008 | Logical CP 0: 000-00002200 | Logical CP 1: 000-00002210 | Logical CP 2: 000-00002220 | Logical CP 3: 000-00002230 | Logical CP 4: 000-00002240 | Logical CP 5: 000-00002250 | Logical CP 6: 000-00002260 | Logical CP 7: 000-00002270 |
| | Logical CP 8: 000-00002280 | Logical CP 9: 000-00002290 | Logical CP A: 000-000022A0 | Logical CP B: 000-000022B0 | Logical CP C: 000-000022C0 | Logical CP D: 000-000022D0 | Logical CP E: 000-000022E0 | Logical CP F: 000-000022F0 |
| 1 CongrCl: 009 | Logical CP 10: 000-00002600 | Logical CP 11: 000-00002610 | Logical CP 12: 000-00002620 | Logical CP 13: 000-00002630 | Logical CP 14: 000-00002640 | Logical CP 15: 000-00002650 | Logical CP 16: 000-00002660 | Logical CP 17: 000-00002670 |
| | Logical CP 18: 000-00002680 | Logical CP 19: 000-00002690 | Logical CP 1A: 000-000026A0 | Logical CP 1B: 000-000026B0 | Logical CP 1C: 000-000026C0 | Logical CP 1D: 000-000026D0 | Logical CP 1E: 000-000026E0 | Logical CP 1F: 000-000026F0 |
| 2 CongrCl: 00A | Logical CP 20: 000-00002A00 | Logical CP 21: 000-00002A10 | Logical CP 22: 000-00002A20 | Logical CP 23: 000-00002A30 | Logical CP 24: 000-00002A40 | Logical CP 2: 000-00002A50 | Logical CP 26: 000-00002A60 | Logical CP 27: 000-00002A70 |
| | Logical CP 28: 000-00002A80 | Logical CP 29: 000-00002A90 | Logical CP 2A: 000-00002AA0 | Logical CP 2B: 000-00002AB0 | Logical CP 2C: 000-00002AC0 | Logical CP 2D: 000-00002AD0 | Logical CP 2E: 000-00002AE0 | Logical CP 2F: 000-00002AF0 |
| 3 CongrCl: 00B | Logical CP 30: 000-00002E00 | Logical CP 31: 000-00002E10 | Logical CP 32: 000-00002E20 | Logical CP 33: 000-00002E30 | Logical CP 34: 000-00002E40 | Logical CP 35: 000-00002E50 | Logical CP 36: 000-00002E60 | Logical CP 37: 000-00002E70 |
| | Logical CP 38: 000-00002E80 | Logical CP 39: 000-00002E90 | Logical CP 3A: 000-00002EA0 | Logical CP 3B: 000-00002EB0 | Logical CP 3C: 000-00002EC0 | Logical CP 3D: 000-00002ED0 | Logical CP 3E: 000-00002EE0 | Logical CP 3F: 000-00002EF0 |
| 3 CongrCl: 00C | Logical CP40: 000-00003200 | Logical CP 41: 000-00003210 | Logical CP 42: 000-00003220 | Logical CP 43: 000-00003230 | Logical CP 44: 000-00003240 | Logical CP 45: 000-00003250 | Logical CP 46: 000-00003260 | Logical CP 47: 000-00003270 |
| | Logical CP 48: 000-00003280 | Logical CP 49: 000-00003290 | Logical CP 4A: 000-000032A0 | Logical CP 4B: 000-000032B0 | Logical CP 4C: 000-000032C0 | Logical CP 4D: 000-000032D0 | Logical CP 4E: 000-000032E0 | Logical CP 4F: 000-000032F0 |

Note: There are no spare congruence classes defined, sparing is by switching compartment or pipe only.

FIG. 5

METHOD, SYSTEM AND COMPUTER PROGRAM PRODUCT FOR DATA BUFFERS PARTITIONED FROM A CACHE ARRAY

BACKGROUND OF THE INVENTION

This invention relates generally to path buffers in processors, and more particularly to providing data buffers partitioned from a cache array.

Large computer systems with many data paths interconnecting a large number of processors, I/O devices, and sliced memories and caches, require many data buffers to temporarily hold data in transit from one location in the system to another. Implementing this large number of data path buffers using separate discrete arrays placed individually on a chip floorplan increases densities for wiring, and typically implements a number of smaller memory arrays that are not as area or power efficient as larger arrays typically used for cache memory. System capabilities may be limited by the number of such buffers that can be placed in a design. Smaller systems with chip real estate constraints may also suffer similar limitations.

Currently, cache memory arrays ware utilized only for holding data associative with data from main memory in a corresponding congruence class within the cache, and identified by a cache directory, and managed by a cache replacement algorithm. Other temporary buffers needed for holding data being manipulated or transported between points were implemented as separate dedicated buffers located elsewhere on the chip. Placing such dedicated data buffers increases chip area, wiring complexity, and power utilization and may limit the number of data buffers that may be provided, increase the area and cost of the chip, or both.

BRIEF SUMMARY OF THE INVENTION

An exemplary embodiment includes a method in a processor and for providing data buffers partitioned from a cache array, the method including clearing cache directories associated with the processor to an initial state, obtaining a selected directory state from a control register preloaded by the service processor, in response to the control register including the desired cache state, sending load commands with an address and data, loading cache lines and cache line directory entries into the cache and storing the specified data in the corresponding cache line.

Another exemplary embodiment includes a system for providing data buffers partitioned from a cache array in a cache having least recently used logic, the system including a main processor having a cache memory, a service processor coupled to the main processor, wherein the service processor sends commands to the cache to first load cache lines and corresponding cache line directory entries with a reserved state for reserved data buffers, a bootstrap load mechanism configured to initialize directory entries and corresponding cache entries to reserve the data buffers by, obtaining the selected directory state from a control register preloaded by the service processor, in response to the control register containing a desired cache state, sending bootstrap code load commands with an address and data, storing specified data in a corresponding cache line and setting a directory state to a value specified from a bootstrap control register.

A further exemplary embodiment includes a computer program product for providing data buffers partitioned from a cache array, the computer program product including a tangible storage medium readable by a processing circuit and storing instructions for execution by the processing circuit for performing a method including obtaining a selected directory state from a control register preloaded by a service processor, in response to the control register containing a desired cache state, sending bootstrap code load commands with an address and data, storing specified data in a corresponding cache line and setting a directory state to a value specified from a bootstrap control register.

BRIEF DESCRIPTION OF THE DRAWINGS

Referring now to the drawings wherein like elements are numbered alike in the several FIGURES:

FIG. 4 illustrates a table having cache locations in accordance with exemplary embodiments;

FIG. 5 illustrates a table having locations that are reserved for sense/control response data in accordance with exemplary embodiments.

DETAILED DESCRIPTION OF EXEMPLARY EMBODIMENTS

Figure 1:
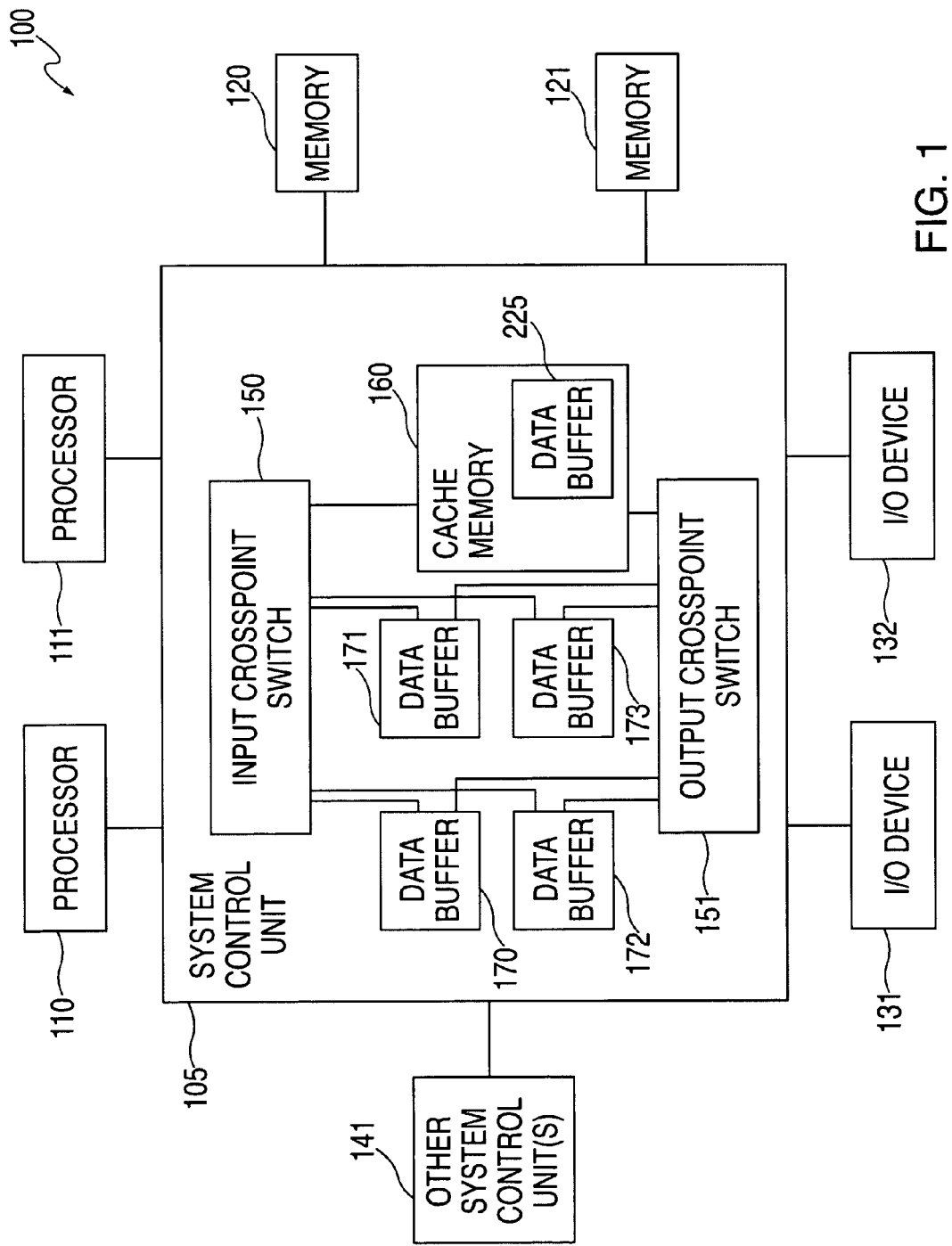
FIG. 1 illustrates one example of a computer system containing a system control unit providing data buffers and a cache memory, and providing interconnections between processors, memory, I/O, and other interconnected system control units in accordance with an exemplary embodiment.

An exemplary embodiment of the present invention provides systems, methods and computer program products that improve processor data flow with fewer physical array structures for buffering data. In exemplary embodiments, separate data flow buffers are eliminated and selected individual cache lines are logically removed from eligibility for caching data. In addition, the individual cache lines are reassigned as dedicated data buffers for specific purposes. In exemplary embodiments, a special state or states are established in the cache directory marking selected cache locations reserved as special-purpose data buffers, and by implementing logic in data flow controllers that is able to address and access these pre-programmed locations as data buffers, and by making the cache LRU and directory results compare aware of the need for special handling of these locations. In exemplary embodiments, each data flow controller is assigned a specific buffer location or locations, and the matching cache location or locations are marked reserved by a special state in the cache directory. Once reserved with this special state, the corresponding cache line is not used as part of the general purpose data cache, but may be read and written only by the owning data flow controller. The data flow controllers are then allowed to use their assigned cache lines for holding data temporarily while it is in transit from one location to another, or permanently for other purposes, by performing cache accesses to their specified congruence class and compartment. Since the cache array is very large compared with the number of data buffers needed, reassigning a small number of cache lines to serve as special-purpose data buffers has only a small effect on the overall cache efficiency for its intended purpose.

In an exemplary embodiment, the systems and methods described herein provide a hardware implementation of buffering for data movement between different parts of a system wherein data received from one interface may need to be held temporarily before transmission on another outbound interface. Fewer dedicated data buffers are implemented for hardware data manipulation and transport functions by utilizing individual lines with a local cache to act in place of dedicated data buffers. In an exemplary embodiment, the special data buffers may be reserved by means of special entries within the cache directory. The cache locations remain permanently reserved and dedicated to this purpose and are not available to the cache controller to hold memory-coherent data corresponding to any location in system memory. In an exemplary embodiment, the special directory states needed to reserve these cache lines may be initialized during system initialization, and may remain statically assigned to this purpose for the duration of system operation. The initialization of these directory states may be realized by dedicated hardware as part of the initial system reset, or may be written by system initialization software running on a service processor prior to loading operating system or application software and utilizing the cache for holding data for these applications. Once established as data buffers by special directory states, these reserved cache locations are utilized only to support specific assigned data manipulation and transport functions. In an embodiment, each hardware data or transport function may be assigned a corresponding specific location in the cache to support its corresponding function.

In exemplary embodiments, the systems and methods described herein mark selected individual lines from a cache memory, including a cache memory and associated cache directory, as unavailable for holding cached memory data. The systems and methods described herein further reserve the data buffers for use as special-purpose data buffers by means of special cache directory entries with said special-purpose data buffer locations known to the respective data manipulation and transfer functions, and accessed by the data manipulation and transfer functions by specification of a location, instead of by lookup in the cache directory as is done for locating memory-coherent data held in other locations of the cache. In exemplary embodiments, the special reserved cache locations are established and permanently reserved by writing special states into individual cache directory entries during system initialization before the directory locations and corresponding cache entries have been occupied with cached memory data and prior to utilization of the cache to hold memory-coherent data and corresponding writing of directory entries to record the contents of said cache locations. Furthermore, the cache least-recently-used replacement algorithm does not select the reserved cache locations to be replaced by new memory coherent data. In addition, dataflow controllers are assigned a specific location in the cache for holding data for a specific function, and are constructed to provide the cache location of their assigned data buffer when reading or writing the cache without dependency on searching the cache directory for their assigned data buffer location. In exemplary embodiments, the cache access mechanism supports locating memory-coherent data in the cache via directory lookup, and separately locates special data buffer locations by means of a location identified by the requesting data controller and not by cache directory lookup.

FIG. 1 illustrates a computer system 100 including a system control unit 105 providing data buffers and a cache memory, and providing interconnections between processors 110, 111, memory 120, 121, I/O devices 131, 132, and other interconnected system control units 141 servicing additional processors, memory, and I/O devices (Not Shown). In an exemplary embodiment, the system control unit 105 may include crosspoint switches 150, 151 for routing inbound data 150 and outbound data 151, and providing interconnections to various dedicated data buffers 170, 171, 172, 173 and a cache memory or memories 160. In an exemplary embodiment, some data buffers 225 may be physically located within the cache memory array 160, thereby reducing the number of physical buffers 170, 171, 172, 173 required and the number of interconnections required at the crosspoint switches 150, 151, reducing overall system complexity.

Figure 2:
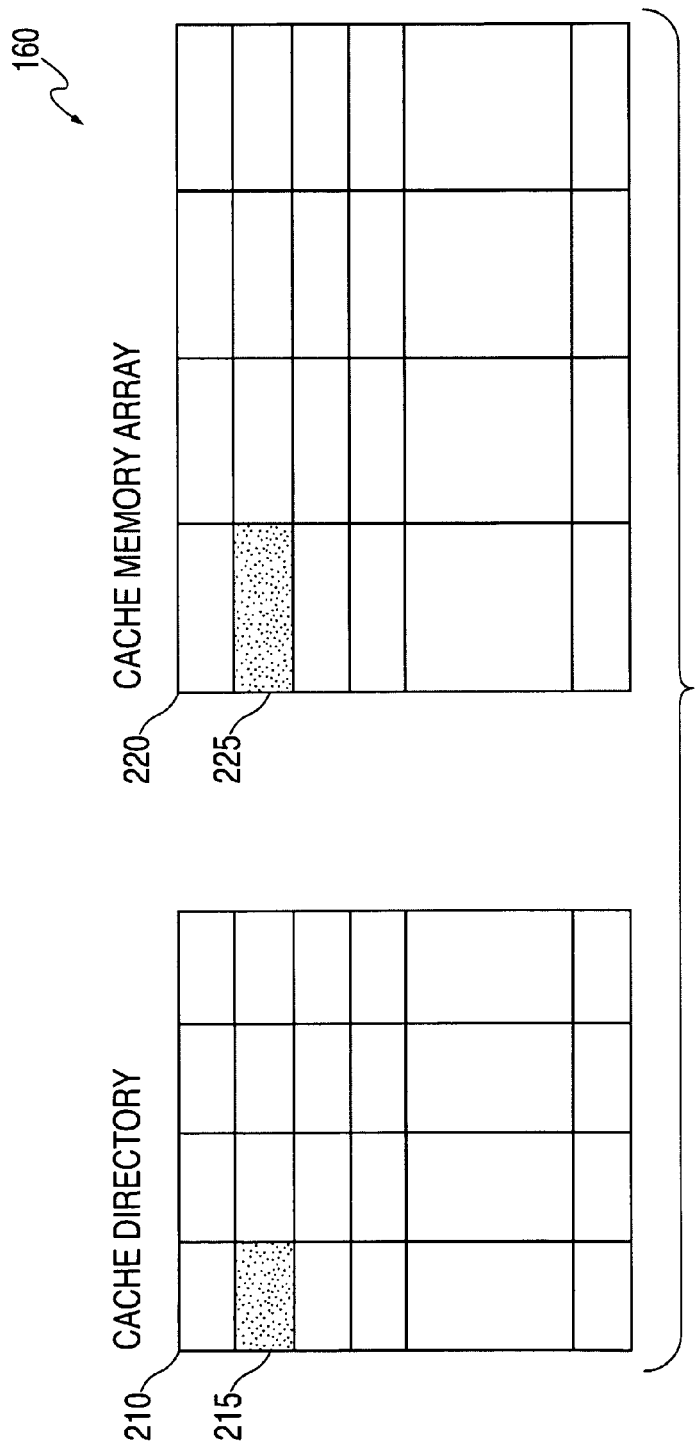
FIG. 2 illustrates one example of a cache memory array and corresponding cache directory

FIG. 2 illustrates the cache memory system 160 that includes a cache memory array 220 and a corresponding cache directory array 210 with a directory entry 215 corresponding to each cache line 225 that keeps a record the data contained in the corresponding cache line 225. In an exemplary embodiment, depending on the directory contents, the cache line 225 may be implemented either to hold memory data in the usual context of a cache, or that selected cache lines may be reserved to act as dedicated data buffers.

Figure 3:
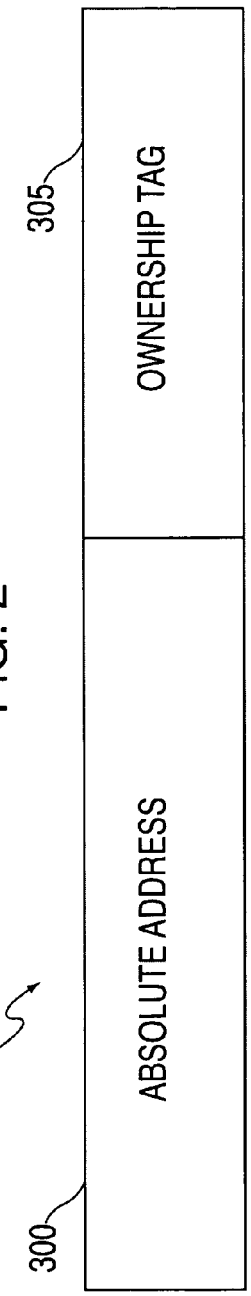
FIG. 3 illustrates one example of a cache directory entry

FIG. 3 illustrates the contents of a cache directory entry 215. In an exemplary embodiment, the directory entry contains subfields identifying the absolute address stored 300 for normal cached memory data and an ownership tag 305 identifying the ownership of the data. In an exemplary embodiment, the ownership tag is a multi-bit field that identifies one of several possible states for the corresponding cache line. These states may include: invalid (unowned), valid, and reserved. In an exemplary embodiment, the invalid (unowned) state indicates that the corresponding cache entry is unused and is available to be assigned to hold cached memory data. The absolute address field of the directory is not used when the ownership tag is in this state. In an exemplary embodiment, the valid state indicates that the corresponding cache line contains cached data for the absolute address identified by the absolute address field of the directory entry. This state may have multiple sub-states identifying the ownership state, for example unchanged or changed, read-only, held in a multiple-copy read-only state or assigned exclusive to one owner for purposes of a coherent data update. Data held in this directory state or states is subject to being selected by the cache LRU (least-recently used replacement algorithm) logic to be replaced by more recently accessed memory data. Replacement may entail marking the location invalid and overwriting the cache line and directory entry (if the prior data is unchanged), or writing the data back to the identified memory absolute address prior to allowing the cache and corresponding directory entry to be reloaded (if the prior data is changed). In an exemplary embodiment, the reserved state is a new special state as described herein. In this directory state, the absolute address field is not required to further identify data. However, it is appreciated that alternate embodiments contemplate information about the ownership or time of access or corresponding memory absolute address that may optionally be saved in the absolute address sub-field of the directory entry. Data held in this directory state is ineligible to be selected by the cache LRU (least-recently used replacement algorithm) logic to be replaced by memory data. Other directory states might also be contemplated, for example a Deleted state that identifies unusable or defective cache locations.

EXAMPLE

For illustrative purposes are described herein with respect to an exemplary embodiment, an IBM z10 processor is discussed as an example. It is appreciated that other processors are contemplated in other exemplary embodiments. In a z10 processor, L2 (level-2) cache arrays are utilized with 24-way associativity and 2048 congruence classes. Each cache contains a total of 49152 lines. In exemplary embodiments, four of the above-described caches per node are implemented in a z6 processor, across four independent address pipelines As part of system initialization, the cache directories are cleared to an initial state. All directory entries are initially cleared to an unoccupied, available state ("invalid"). Prior to the first usage of the cache, a service processor implements a mechanism for loading bootstrap millicode into the cache to first load specific cache lines and their corresponding directory entries with a special reserved state for reserved data buffers. The bootstrap load mechanism obtains the selected directory state from a control register preloaded by the service processor. Once the control register contains the desired cache state, the bootstrap code load commands are sent with an address and data. The cache LRU logic takes the address for these special bootstrap commands, and locates an available cache line (e.g., the first available compartment in the selected congruence class) without reliance on directory lookup (with the cache being initially empty). In another exemplary embodiment, the above-described process can also load a compartment specified by the service element, rather than depend on the least recently used (LRU) logic to identify a compartment. The bootstrap load process then stores the specified data in the corresponding cache line, and sets the directory state to the value specified from the bootstrap control register. This process initializes the necessary directory entries and corresponding cache entries to reserve the necessary data buffers, and ready bootstrap code for execution.

In exemplary embodiments, for accessing these buffer locations during normal operation of the processor, the cache controller recognizes special access mode requests and accesses the special locations from the compartment specified by the controller, instead of obtaining the compartment from directory hit results or LRU selection as used in normal coherent memory cache accesses. An another exemplary embodiment, the compartment can be located via a directory search, with directory "hit" results reporting the location of the reserved compartment instead of results of a memory coherent address compare, when searched in a special mode to locate reserved compartments.

As discussed above, an illustrative z10 processor L2 cache directory states are defined as follows:

"EEEEE" is a 5 bit value where each bit corresponds to which of the 5 CP chips on this node has a EX copy of the line. Only one bit may be active at a time. "MMMM" is a four bit value where each bit corresponds to which of the four cores on the RO CP chips may have a RO copy of the line. In z10, each of the 5 CP chips contains four processors (the 5 CP chips contain a total of 20 processors). These 4 bits identify which of the processor(s) on a CP chip may have; a copy of the line. "RO" means the processor(s) hold the data in a Read-Only state where they are not allowed to modify the data (because there may be other copies in other processors). More than one bit may be active at a time. Each bit is active whenever the corresponding core on any of the RO CP chips has a RO copy of the line. "NNNN" is a four bit value where each bit corresponds to which of the four cores on the EX CP has the EX copy of the line. EX" means the data is held in an exclusive state by a processor. This means this processor holds the data exclusively (it has the only copy). Data held in an exclusive state is allowed to be modified (because no other processor has a copy). For each memory location to be seen as containing the same data by any processor (required by z10 memory coherency rules), the location must be accessible only to the one updating processor during any update. Only one bit may be active at a time. "IM=1 MC=1" Lock is a temporary state used during an IO Partial Store operation to prevent any other operation from accessing the line until the IO partial store controller is able to complete updating the local cache with the store data. "IM"—this is "Intervention Master", and applies to only one copy if the data is held in multiple caches (multi-copy). This identifies which of the multiple copies will respond to a request by other caches for a copy of the data, and is to prevent multiple responses to a broadcast request for cached data. "MC" designates that multiple copies of the data may exist in different caches. This is possible only if the data is in a read-only (as opposed to exclusive) state, where none of the copies are allowed to be updated (to update, redundant copies must first be invalidated). The IO partial store controller is a state machine that modifies data (one example of a "data manipulation and transfer function" described elsewhere). "IM=1 MC=0 EX" Unowned state is the final directory state for lines updated in the cache during IO Store operations or lines left in the local cache during IO Partial

TABLE 1

| IM (intervention master) | MC (multi-copy) | EX (exclusive) | CHIPID (1:4) | COREID (0:3) | Description |
| --- | --- | --- | --- | --- | --- |
| 0 | 0 | 0 | 00000 | 0000 | Invalid |
| 0 | 0 | 1 | 00000 | 0000 | Deleted |
| 0 | 1 | 0 | 00000 | 0000 | IM = 0 MC = 1 RO Unowned |
| 0 | 1 | 0 | RRRRR | MMMM | IM = 0 MC = 1 RO CP |
| 0 | 1 | 1 | 00000 | 0000 | Reserved Data Buffer |
| 1 | 0 | 0 | 00000 | 0000 | IM = 1 MC = 0 EX Unowned |
| 1 | 0 | 0 | RRRRR | MMMM | IM = 1 MC = 0 RO CP |
| 1 | 0 | 1 | EEEEE | NNNN | IM = 1 MC = 0 EX CP N |
| 1 | 1 | 0 | RRRRR | MMMM | IM = 1 MC = 1 RO CP |
| 1 | 1 | 1 | 00000 | 0000 | Lock |

In Table 1, "RRRRR" is a 5 bit value where each bit corresponds to which of the 5 CP chips on this node has a RO copy of the line. More than one bit may be active at a time. store operations. "IM=0 MC=1 RO" Unowned state can only be reached as the result of a Remote CP Fetch to a line that exists IM=1 MC=0 EX Unowned. The "reserved Data Buffer" state is only used by the fixed cache slots being used as IO Fetch Buffers or IO XCMD registers. The directory hit logic treats this state the same as "deleted". Invalid lines are unoccupied and available for use. Deleted lines (marked in the directory) indicate the corresponding location in the cache array is unusable. Lines are normally marked in this state if they contain bad memory cells. It is appreciated that this table is illustrated for illustrative purposes only and does not limit exemplary embodiments.

As discussed above, prior to the first usage of the cache, a service processor implements a mechanism for loading bootstrap millicode into the cache to first load specific cache lines and their corresponding directory entries with a special reserved state for reserved data buffers. In exemplary embodiments, a bootstrap load mode is enabled by control registers at the service processor interface:

| Bit | Description |
|---|---|
| | Bootstrap Mode Register: |
| 0 | Bootstrap Mode Enable |
| | ValueDefinition |
| | 0 = Normal Mode |
| | 1 = Bootstrap Mode |
| | Bootstrap Ownership Control Register: |
| 0..11 | Directory State (ownership Tag) |
| | Bits Definition |
| | 0 = IM (intervention master) |
| | 1 = MC (multiple copy) |
| | 2 = EX (exclusive) |
| | 3 . . . 7 = chipID (owning CP chip) |
| | 8 . . . 11 = coreID (owning core(s)) |
| | Hex Bootstrap Initialization State |
| | 0x600 = Reserved Data Buffer (IM = 0, MC = 1, EX = 1, chipID = 00000, coreID = 0000) |
| | 0x800 = Read-only bootstrap code (IM = 1, MC = 0, EX = 0, chipID = 00000, coreID = 0000) |

In exemplary embodiments, for writes from the service processor, the writes are either normal memory-coherent writes that first use the cache directory to search for the target address in cache (i.e., the default, during normal system operation when the "Bootstrap Mode Enable" bit is off) or special bootstrap code writes that do not first search the directory.

In exemplary embodiments, when the "Bootstrap Mode Enable" bit is on, which is used only prior to bootstrap code execution during initialization, the cache does not perform a directory lookup to search for data. Instead, the cache implements the LRU logic to locate an empty "invalid" cache compartment, and stores the supplied data to this compartment, and writes the directory with the state specified in the Bootstrap Ownership Control Register. In exemplary embodiments, the service processor then initializes pre-selected cache lines to be reserved data buffers (for these only the directory state is important, no specific data is required). The service processor then loads bootstrap code for system startup into additional locations, turns off the "Bootstrap Mode Enable" bit and starts a processor to execute the bootstrap code. In addition, the reserved data buffer location parameters are pre-initialized into each data flow controller or controllers, requiring one or more data buffers, either by a fixed definition, or be loaded to configurable control registers by the service processor. Once bootstrap code execution begins, bootstrap code is found by the processor via a normal directory lookup, but the reserved data buffer contents are not visible to a processor through this process (i.e., directory lookups don't produce a "hit" result for these locations).

In exemplary embodiments, the data buffer locations are changed (by writing different addresses during the initialization phase, and by reprogramming data flow controllers with different access parameters) to avoid use of cache locations with bad memory cells, should any exist.

In exemplary embodiments, a spare data buffer location can be substituted in a different cache line, should a cache line containing a pre-assigned data buffer fail with bad memory cells.

In the illustrative z10 example, the reserved data buffers (also known as fixed cache slots) are used as temporary data buffers for I/O fetch data, and to hold response data from sense/control reads from I/O. FIG. 4 illustrates a table having cache locations that are reserved in high-end z6 systems for I/O fetch data (mid-range systems will use slightly different assignments). FIG. 5 illustrates a table having locations that are reserved for sense/control response data. In exemplary embodiments, one compartment per congruence class is utilized to minimize the impact on cache efficiency. Each of the main cells in the table contains 2 lines, e.g. 000-00004000 (which is a memory address corresponding to the cache location and is the address sent by the bootstrap load process during initial creation of the directory entry, although only 12 of the address bits are actually significant) and "CongrCl: 010" which is the cache congruence class (row within the cache). Note that each of the congruence classes in the cells of the table is different: 010, 011, 012, 013, 014, 015, 016, 017, 030, 031, 032, etc.—this is the "one compartment per congruence class" referred to. In practice, the reserved (fixed) cache slot is in compartment 0 of each of these congruence classes. In the second table, there are actually 5 cache lines, in congruence classes 008, 009, 00A, 00B, 00C, on the left; the corresponding cache lines are actually subdivided to contain 16 pieces of data each (response data for 16 processors) as listed in the main body of the table.

Figure 6:
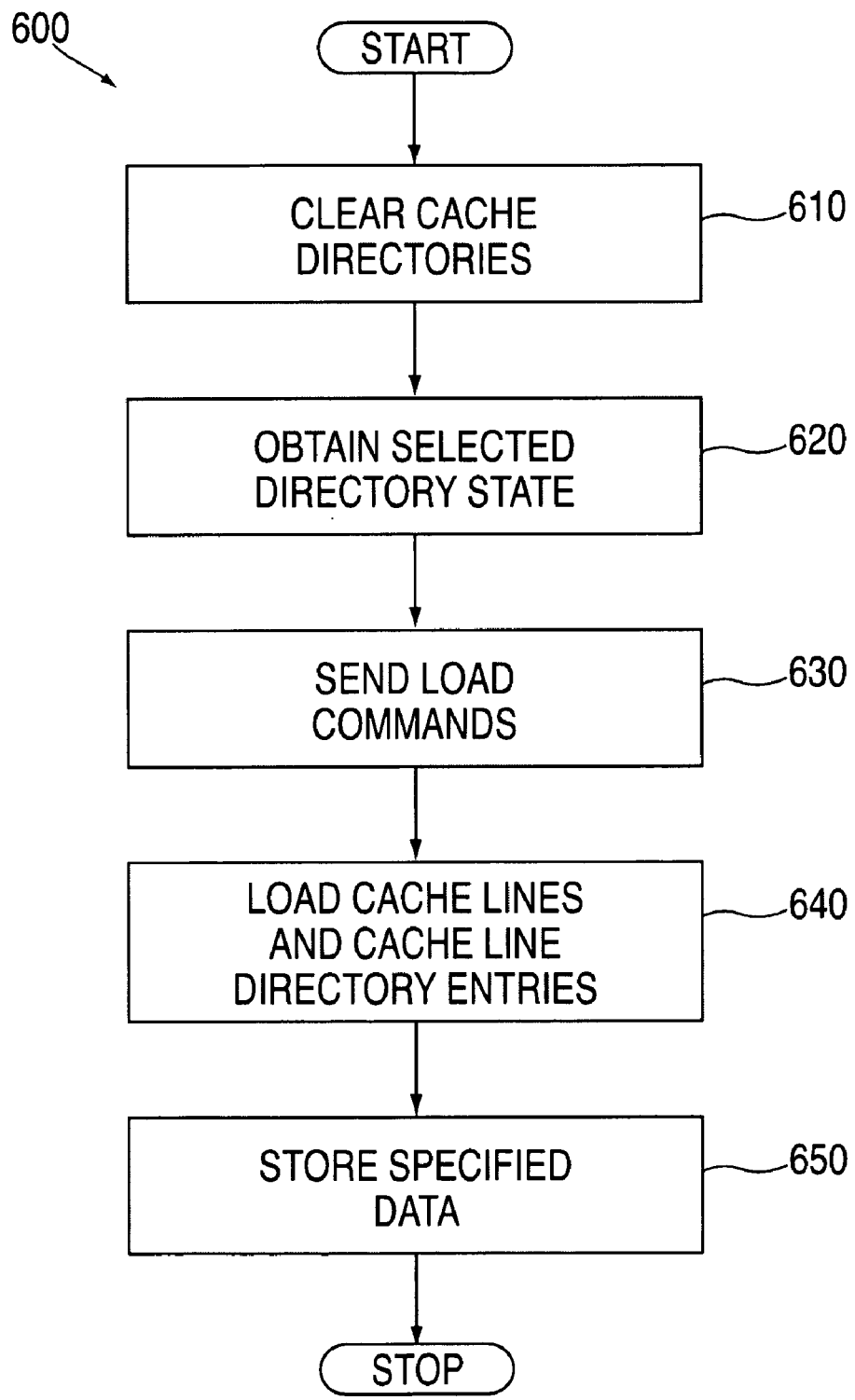
FIG. 6 illustrates a flow chart of an example method for providing data buffers partitioned from a cache array in a memory cache in accordance with an exemplary embodiment.

FIG. 6 illustrates a flow chart of an example method 600 for providing data buffers partitioned from a cache array in a memory cache in accordance with an exemplary embodiment. At block 610, the system 100 clears cache directories associated with the processor to an initial state. At block 620, the system 100 obtains a selected directory state from a control register preloaded by the service processor. At block 630, in response to the control register including the desired cache state, the system 100 sends load commands with an address and data. At block 640, the system loads cache lines and cache line directory entries into the cache. At block 650, the system 100 stores the specified data in the corresponding cache line.

Technical effects and benefits include the ability to create a simpler and more efficient data flow with fewer physical array structures for buffering data. Data flow buffers are eliminated and instead selected individual cache lines are logically removed from eligibility for caching data, and the individual cache lines are reassigned as dedicated data buffers for specific purposes. The provision of a special directory state within the cache directory allows individual lines within the cache array to be re-purposed to act as data buffers for hardware data manipulation and transport functions in place of implementing separate dedicated data buffers for these specific functions. The data within these buffers is associated only with the corresponding hardware data manipulation or transport function, and is in no way associated with any location in memory by virtue of the location within the cache array. The advantages of this approach are a simplification of wiring and placement on the chip due to fewer physical data buffers, and a reduction in total chip area due to utilization of high-density cache space for data buffers in place of smaller dedicated buffers having their own associated access circuitry and wiring, and flexibility of adjusting buffer capacity as needed for specific system configurations, for example by releasing buffer space back to cache space if corresponding hardware functions are not used in a particular system configuration.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. In a processor, a method for providing data buffers partitioned from a cache array in a memory cache and configured to be read and written by an owning data flow controller, the method comprising:
    clearing cache directories associated with the processor to an initial state;
    initializing pre-selected cache lines to be reserved individual cache lines;
    determining a selected directory state that includes an ownership tag indicating a reserved state for the owning data flow controller to read and write from and to the reserved individual cache lines, the ownership tag indicating that data held in the reserved directory state is ineligible for data caching, wherein an absolute address field of an associated directory is not specified in response to the ownership tag being in reserved state, and the reserved individual cache lines are not used as part of the memory cache, and are read and written only by the owning data flow controller;
    in response to the desired cache state, sending load commands with an address and data;
    loading cache lines and cache line directory entries into the cache;
    storing the specified data in the corresponding cache line, and
    setting the directory state to the value specified.

2. The method as claimed in claim 1 wherein the cache directories are initially cleared to an invalid state.

3. The method as claimed in claim 1 wherein the cache lines and the corresponding cache line directory entries are loaded into the cache with a reserved state for reserved data buffers.

4. The method as claimed in claim 3 further comprising accessing buffer locations by recognizing special access mode requests and accessing the reserved data buffers utilizing a specified cache congruence class and compartment.

5. The method as claimed in claim 1 wherein the available cache line is a first available compartment in a selected congruence class.

6. The method as claimed in claim 1 further comprising providing reserved data buffers within the cache memory by marking selected individual cache lines from the cache memory, having the cache memory array and an associated cache directory, as unavailable for holding cached memory data.

7. The method as claimed in claim 6 further comprising reserving the data buffers, having cache directory entries, the data buffers being available to respective data manipulation and transfer functions, and accessible by the data manipulation and transfer functions by a specification of a location of the data buffers.

8. A system for providing data buffers partitioned from a cache array in a cache having least recently used logic, the system comprising:
    a main processor having a cache memory;
    a service processor coupled to the main processor, wherein the service processor sends commands to the cache to first load cache lines and corresponding cache line directory entries with a reserved state for reserved data buffers;
    an owning data flow controller coupled to the service processor and configured to read the reserved data buffers;
    a bootstrap load mechanism configured to initialize directory entries and corresponding cache entries to reserve the data buffers by:
    clearing cache directories associated with the main processor to an initial state;
    initializing pre-selected cache lines to be reserved individual cache lines;
    determining a selected directory state that includes an ownership tag indicating the reserved state for the owning data flow controller to read and write from and to the reserved individual cache lines, the ownership tag indicating that data held in the reserved directory state is ineligible for data caching, wherein an absolute address field of an associated directory is not specified in response to the ownership tag being in the reserved state, and the reserved individual cache lines are not used as part of the cache and are read and written only by the owning data flow controller;
    in response to the desired cache state provided by the service processor, sending bootstrap code load commands with an address and data;
    loading cache lines and cache line directories into the cache;
    storing specified data in a corresponding cache line; and
    setting a directory state to a value specified by the service processor.

9. The system as claimed in claim 8 wherein the least recently used logic is configured to receive the address and locate an available cache line.

10. The system as claimed in claim 9 wherein the available cache line is a first available compartment in a selected congruence class.

11. The system as claimed in claim 10 wherein the bootstrap load mechanism is configured to identify and load the first available compartment.

12. The system as claimed in claim 8 wherein the processor is configured to recognize a special access mode request and accesses locations from a compartment specified by the processor.

13. The system as claimed in claim 8 wherein the reserved data buffers are provided within a cache memory by marking selected individual cache lines from the cache memory, having the cache memory array and an associated cache directory, as unavailable for holding cached memory data.

14. The system as claimed in claim 13 wherein the data buffers, having cache directory entries, are available to respective data manipulation and transfer functions, and accessible by the data manipulation and transfer functions by a specification of a location of the data buffers.

15. A computer program product for providing data buffers partitioned from a cache array in a cache memory and configured to be read and written by an owning data flow controller, the computer program product comprising:
a tangible storage medium readable by a processing circuit and storing instructions for execution by the processing circuit for performing a method comprising:
clearing cache directories associated with the main processor to an initial state;
initializing pre-selected cache lines to be reserved individual cache lines;
determining a selected directory state that includes an ownership tag indicating a reserved state for the owning data flow controller to read and write from and to the reserved individual cache lines, the ownership tag indicating that data held in the reserved directory state is ineligible for data caching, wherein an absolute address field of an associated directory is not specified in response to the ownership tag being in the reserved state, and the reserved individual cache lines are not used as part of the cache memory and are read and written only by the owning data flow controller;
in response to the desired cache state, sending bootstrap code load commands with an address and data;
loading cache lines and cache line directories into the cache;
storing specified data in a corresponding cache line; and
setting a directory state to a value specified by the service processor.

16. The computer program product as claimed in claim 15 wherein the cache directories are initially cleared to an invalid state.

17. The computer program product as claimed in claim 15 wherein the method further comprises:
accessing buffer locations by recognizing special access mode requests and accessing the reserved data buffers, wherein the cache lines and the corresponding cache line directories are loaded into the cache with a reserved state for reserved data buffers.

18. The computer program product as claimed in claim 15 wherein the available cache line is a first available compartment in a selected congruence class.

19. The computer program product as claimed in claim 18 wherein the method further comprises providing reserved data buffers within the cache memory by marking selected individual cache lines from the cache memory, having the cache memory array and an associated cache directory, as unavailable for holding cached memory data.

20. The computer program product as claimed in claim 19 the method further comprises reserving the data buffers, having cache directory entries, the data buffers being available to respective data manipulation and transfer functions, and accessible by the data manipulation and transfer functions by a specification of a location of the data buffers.

* * * * *